US011960342B2

(12) United States Patent
Chamberlin et al.

(10) Patent No.: US 11,960,342 B2
(45) Date of Patent: Apr. 16, 2024

(54) SUSTAINABILITY-AWARE COMPUTING DEVICE BEHAVIOR MANAGEMENT

(71) Applicant: Microsoft Technology Licensing, LLC, Redmond, WA (US)

(72) Inventors: Scott Thomas Chamberlin, Bellevue, WA (US); Malav Mukeshbhai Shah, Redmond, WA (US); Devin Nathaniel Roberts, Maple Valley, WA (US); Scott Rosoff, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/721,883

(22) Filed: Apr. 15, 2022

(65) Prior Publication Data

US 2023/0251701 A1    Aug. 10, 2023

Related U.S. Application Data

(60) Provisional application No. 63/308,229, filed on Feb. 9, 2022.

(51) Int. Cl.
*G06F 1/3206* (2019.01)
(52) U.S. Cl.
CPC ................. *G06F 1/3206* (2013.01)
(58) Field of Classification Search
CPC .................................................. G06F 1/3206
See application file for complete search history.

(56) References Cited

U.S. PATENT DOCUMENTS

| 9,129,231 B2 | 9/2015 | Kaufman et al. |
| 2010/0010857 A1 | 1/2010 | Fadell |

(Continued)

FOREIGN PATENT DOCUMENTS

| CN | 112950098 A | 6/2021 |
| CN | 113672383 A | 11/2021 |

OTHER PUBLICATIONS

"Amazon Sustainability 2020 Report", Retrieved from: https://sustainability.aboutamazon.com/pdfBuilderDownload?name=amazon-sustainability-2020-report, Jun. 2021, 138 Pages.

(Continued)

*Primary Examiner* — Gary Collins

(57) ABSTRACT

Aspects of the present disclosure relate to sustainability-aware computing device behavior management. In examples, a sustainability platform obtains sustainability information associated with an energy grid, as may be provided by a data provider. The sustainability platform may provide a sustainability forecast, which may be received and cached by a computing device. The computing device may use the sustainability forecast to manage various device functionality, such that functionality may be performed during one or more times that are identified to have a comparatively lower environmental impact, thereby deferring device energy consumption during a time forecasted to have a higher environmental impact. The sustainability forecast cached by the computing device may be updated on a periodic basis or in response to determining that the location of the computing device (and, potentially, the associated energy grid) has changed, among other examples.

20 Claims, 11 Drawing Sheets

(56) References Cited

U.S. PATENT DOCUMENTS

| | | | | |
|---|---|---|---|---|
| 2011/0082598 | A1* | 4/2011 | Boretto | H02J 3/381 |
| | | | | 700/297 |
| 2011/0231028 | A1 | 9/2011 | Ozog | |
| 2012/0166616 | A1* | 6/2012 | Meehan | G06Q 50/06 |
| | | | | 709/224 |
| 2013/0080131 | A1 | 3/2013 | Kaufman et al. | |
| 2018/0031533 | A1* | 2/2018 | Rawat | G06Q 50/06 |
| 2020/0006943 | A1 | 1/2020 | Strong et al. | |
| 2020/0372588 | A1* | 11/2020 | Shi | G06N 3/08 |
| 2021/0149351 | A1* | 5/2021 | Radovanovic | G06F 9/5094 |
| 2022/0144121 | A1* | 5/2022 | Grunkemeyer | G06N 3/088 |
| 2022/0144122 | A1* | 5/2022 | Grunkemeyer | B60L 53/67 |
| 2023/0152108 | A1* | 5/2023 | Vreeland | G01C 21/3469 |
| | | | | 701/420 |

OTHER PUBLICATIONS

"Climate Science in a Nutshell #5: Where Does Carbon Dioxide", Retrieved from: https://www.youtube.com/watch?v=bpazvRVh4y0, Sep. 24, 2010, 3 Pages.

"CO2 emissions from electricity and heat production, total (% of total fuel combustion)", Retrieved from: https://web.archive.org/web/20220401123857/https://data.worldbank.org/indicator/EN.CO2.ETOT.ZS, Apr. 1, 2022, 18 Pages.

"COP26 Explained", Retrieved from: https://web.archive.org/web/20220331110137/https://2nsbq1gn1rl23zol93eyrccj-wpengine.netdna-ssl.com/wp-content/uploads/2021/07/COP26-Explained.pdf, Mar. 31, 2022, 25 Pages.

"Creative Commons", Retrieved from: https://web.archive.org/web/20220507044728/https://creativecommons.org/licenses/by/3.0/, May 7, 2022, 1 Page.

"Environment—Apple", Retrieved from: https://web.archive.org/web/20220430060338/https://www.apple.com/in/environment/, Apr. 30, 2022, 10 Pages.

"Environmental Claims", Retrieved from: https://web.archive.org/web/20220324092621/https://www.ftc.gov/system/files/documents/public_events/975753/ftc_-_environmental_claims_summary_of_the_green_guides.pdf, Mar. 24, 2022, 4 Pages.

"Environmental Progress Report", Retrieved from: https://www.apple.com/environment/pdf/Apple_Environmental_Progress_Report_2020.pdf, Apr. 2019, 99 Pages.

"Explainer: Understanding the Math Behind Microsoft's Commitment to Become Carbon Negative by 2030", Retrieved from: https://www.youtube.com/watch?v=wj0UrF2T130&list=PLFPUGjQjckXFjSDoyihMxhHYxY_QYwOE_&index=7, Jan. 16, 2020, 3 Pages.

"Google Environmental Report 2020", Retrieved from: https://www.gstatic.com/gumdrop/sustainability/google-2020-environmental-report.pdf, Dec. 2020, 82 Pages.

"Google Sustainability", Retrieved from: https://web.archive.org/web/20220506033709/https://sustainability.google/, May 6, 2022, 9 Pages.

"Greenhouse Gas Equivalencies Calculator", Retrieved from: https://www.epa.gov/energy/greenhouse-gas-equivalencies-calculator, Mar. 2022, 4 Pages.

"How much carbon dioxide is produced when different fuels are burned?", Retrieved from: https://web.archive.org/web/20220430011304/https://www.eia.gov/tools/faqs/faq.php?id=73&t=11, Apr. 30, 2022, 2 Pages.

"Life-cycle greenhouse gas emissions of energy sources", Retrieved from: https://en.wikipedia.org/wiki/Life-cycle_greenhouse_gas_emissions_of_energy_sources, Apr. 24, 2022, 10 Pages.

"Misleading graph", Retrieved from: https://en.wikipedia.org/wiki/Misleading_graph#Truncated_graph, Feb. 20, 2022, 13 Pages.

"Parker Collaborates With Danish Start-Up", Retrieved from: https://www.parker-project.com/parker-collaborates-with-danish-start-up/, Dec. 12, 2017, 2 Pages.

"Personal computer (PC) shipments worldwide by vendor from 2009 to 2022", Retrieved from: https://www.statista.com/statistics/263393/global-pc-shipments-since-1st-quarter-2009-by-vendor/, Apr. 2022, 3 Pages.

"Principle 3: Carbon intensity", Retrieved from: https://docs.microsoft.com/en-gb/learn/modules/sustainable-software-engineering-overview/5-carbon-intensity, Retrieved Date: Dec. 15, 2021, 9 Pages.

"The Climate Pledge", Retrieved from: https://web.archive.org/web/20220418052746/https://www.aboutamazon.com/planet/climate-pledge, Apr. 18, 2022, 10 Pages.

"United Nations Framework Convention on Climate Change", Retrieved from: https://en.wikipedia.org/wiki/United_Nations_Framework_Convention_on_Climate_Change, Mar. 19, 2022, 24 Pages.

"Sustainability at Meta", Retrieved from: https://web.archive.org/web/20220429170707/https://sustainability.fb.com/, Apr. 29, 2022, 7 Pages.

Gates, Bill, "This tool will help us get to zero emissions", Retrieved from: https://www.youtube.com/watch?v=2bXn2F58OsM, Feb. 15, 2021, 3 Pages.

J, Bill, "Carbon-Aware Kubernetes", Retrieved from: https://devblogs.microsoft.com/sustainable-software/carbon-aware-kubernetes/, Oct. 5, 2020, 5 Pages.

Kris, et al., "Project Silencer 2016", Retrieved from: https://www.knowthymoney.com/2016/01/project-silencer-2016.html, Jan. 17, 2016, 3 Pages.

Listgarten, Sherry, "When to use Marginal Emissions (and when not to)", Retrieved from: https://www.paloaltoonline.com/blogs/p/2019/09/29/marginal-emissions-what-they-are-and-when-to-use-them, Sep. 29, 2019, 16 Pages.

Radovanovic, Ana, "Our data centers now work harder when the sun shines and wind blows", Retrieved from: https://www.blog.google/inside-google/infrastructure/data-centers-work-harder-sun-shines-wind-blows/, Apr. 22, 2020, 4 Pages.

Romanello, Marina, "Carbon Intensity of the Energy System", Retrieved from: https://public.flourish.studio/visualisation/846643/, Jul. 15, 2020, 1 Page.

Shilov, Anton, "Dell Cannot Ship Alienware PCs to Certain US States Due to Power Regulations", Retrieved from: https://www.tomshardware.com/news/dell-alienware-cannot-ship-to-certain-us-states, Jul. 27, 2021, 13 Pages.

Smith, Brad, "Microsoft will be carbon negative by 2030", Retrieved from: https://blogs.microsoft.com/blog/2020/01/16/microsoft-will-be-carbon-negative-by-2030/, Jan. 16, 2020, 16 Pages.

Wang, et al., "A Survey on Energy Internet Communications for Sustainability", in Journal of IEEE Transactions on Sustainable Computing, vol. 2, Issue 3, Jul. 1, 2017, pp. 231-254.

Yeo, Sophie, "Timeline: the Paris agreement's 'ratchet mechanism'", Retrieved from: https://www.carbonbrief.org/timeline-the-paris-agreements-ratchet-mechanism, Jan. 19, 2016, 4 Pages.

"Environmental Social Governance 2020", Retrieved from: https://web.archive.org/web/20210331010043/https://s22.q4cdn.com/959853165/files/doc_downloads/2021/03/2020-SASB-Report_FINAL.pdf, Mar. 31, 2021, 23 Pages.

Hussain, et al., "How demand shaping can reduce the carbon cost of our applications", Retrieved from: https://leaddev.com/sustainable-software/how-demand-shaping-can-reduce-carbon-cost-our-applications, Aug. 20, 2020, 13 Pages.

"Principle 7: Demand shaping", Retrieved from: https://web.archive.org/web/20210305055834/https://docs.microsoft.com/en-us/learn/modules/sustainable-software-engineering-overview/9-demand-shaping, Mar. 5, 2021, 3 Pages.

K, Conor., "How Demand Shifting Compute Accelerates Our Energy Transition to Renewables", Retrieved from: https://devblogs.microsoft.com/sustainable-software/how-demand-shifting-compute-accelerates-our-energy-transition-to-renewables/, Oct. 1, 2020, 4 Pages.

H, Asim., "Carbon-Aware vs. Carbon-Efficient Applications", Retrieved from: https://devblogs.microsoft.com/sustainable-software/carbon-aware-vs-carbon-efficient-applications/, Nov. 9, 2020, 6 Pages.

Ye, Lu., Introduction to Onlign, Retrieved from: https://web.archive.org/web/20200831201516/https://2020.rca.ac.uk/students/lu-ye/, Aug. 31, 2020, 8 Pages.

(56) References Cited

OTHER PUBLICATIONS

Gates, Bill, "How to Avoid a Climate Disaster: The Solutions We Have and the Breakthroughs We Need", Published by Alfred A. Knopf, Feb. 2021, 274 Pages.
"International Search Report and Written Opinion issued in PCT Application No. PCT/US22/049208", dated Feb. 23, 2023, 11 Pages.
Wiesner, et al., "Let's Wait Awhile: How Temporal Workload Shifting Can Reduce Carbon Emissions in the Cloud", in Repository of arXiv:2110.13234v1, Oct. 25, 2021, 13 Pages.

\* cited by examiner

SUSTAINABILITY-AWARE COMPUTING DEVICE BEHAVIOR MANAGEMENT

CROSS-REFERENCE TO RELATED APPLICATION

This application claims priority to U.S. Provisional Application No. 63/308,229, titled "Sustainability-Aware Computing Device Behavior Management," filed on Feb. 9, 2022, the entire disclosure of which is hereby incorporated by reference in its entirety.

BACKGROUND

Various functionality provided by a computing device may have an associated energy consumption. Further, characteristics of the energy available to the computing device may vary over time, such that device operation at different times may have a different associated environmental impact. However, absent insight into such energy characteristics, the computing device may inadvertently perform tasks at times where the energy characteristics are less favorable than other times, leading to a potentially avoidable or unnecessarily high environmental impact.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to sustainability-aware computing device behavior management. In examples, a sustainability platform obtains sustainability information associated with an energy grid, as may be provided by a data provider. The sustainability platform may provide a sustainability forecast, which may be received and cached by a computing device. The computing device may use the sustainability forecast to manage various device functionality, such that functionality may be performed during one or more times that are identified to have a comparatively lower environmental impact, thereby deferring device energy consumption during a time forecasted to have a higher environmental impact. The sustainability forecast cached by the computing device may be updated on a periodic basis or in response to determining that the location of the computing device (and, potentially, the associated energy grid) has changed, among other examples.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
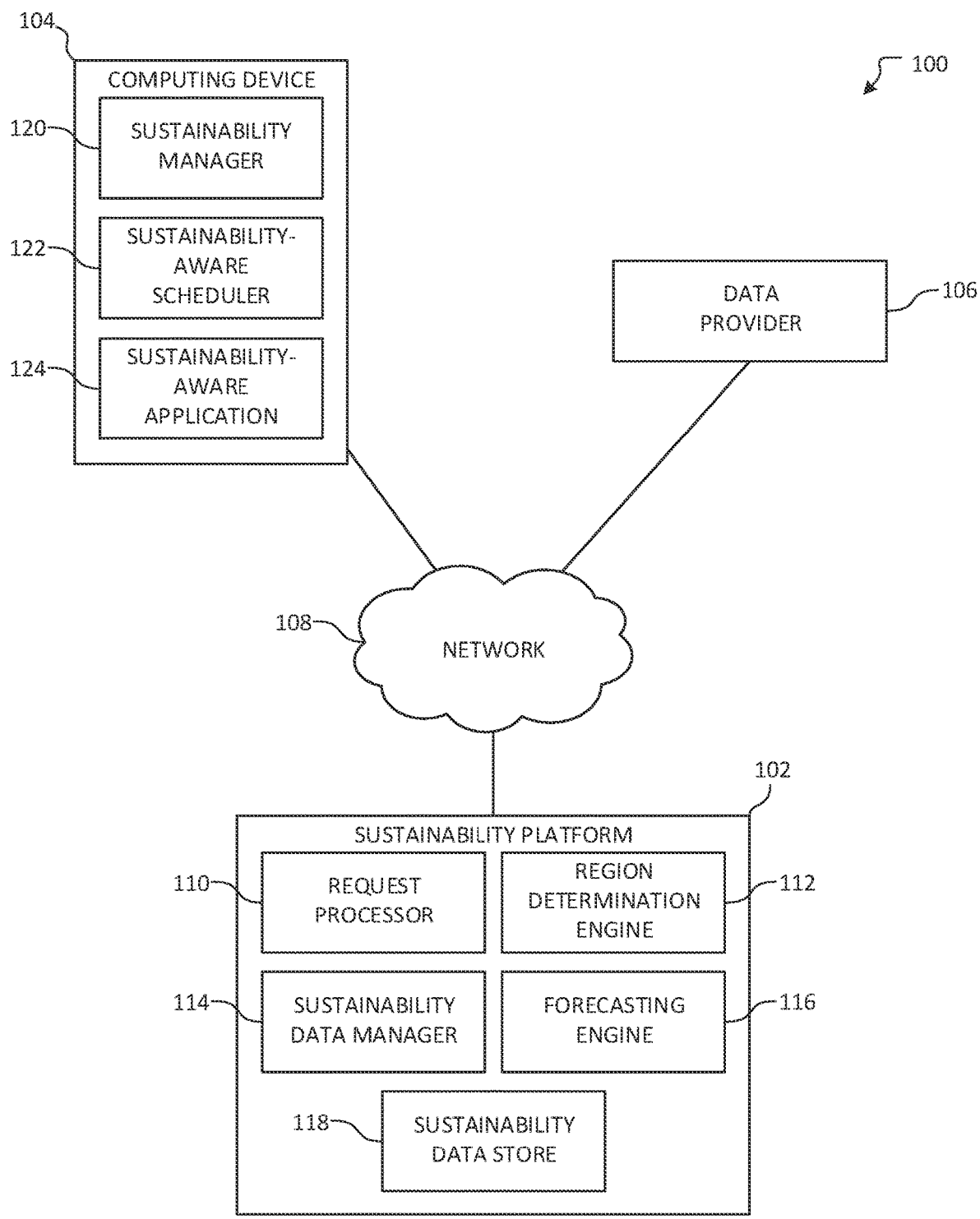
FIG. 1 illustrates an overview of an example system for computing device behavior management according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a computing device has various associated functionality, including, but not limited to, executing applications, executing background services, operating or otherwise utilizing peripheral devices, and/or drawing from or charging an associated battery. Such functionality may have associated energy consumption. For example, executing a background service may increase the relative energy consumption of the computing device and, by extension, the amount of energy drawn from an energy grid (e.g., when the device is not operating on battery power or does not have battery power available). Similarly, charging a battery of the computing device may increase the amount of energy drawn from the energy grid.

However, the energy available from the energy grid may have varying characteristics, such that the impact associated with performing or providing these and/or other functions may vary over time. Thus, absent insight into the characteristics of the energy that is available to the computing device, the computing device may inadvertently have an increased environmental impact that could otherwise be mitigated or avoided, for example by shifting aspects of such functionality to a different time of day and/or by performing intermediate or alternative functionality (e.g., until the initial or "target" functionality is performed). Example energy characteristics include, but are not limited to, a carbon (and/or other resource) intensity associated with the mixture of energy generation for the energy grid and what percentage of the available energy is generated by renewable sources.

As used herein, sustainability information includes information associated with energy characteristics of an energy grid, as may vary over time.

It will be appreciated that aspects of the present disclosure may be similarly applicable to a variety of other resources. For example, water or liquid cooling may be used, such that the availability of a liquid for cooling and/or effectiveness of extracting heat from the liquid may be used to manage the behavior of a computing device accordingly. As another example, manufacturing may be a resource, such that device behavior is managed to lengthen hardware lifespan, thereby avoiding, reducing, or otherwise shifting carbon that may be emitted while manufacturing a replacement part. In such examples, sustainability information may additionally or alternatively include one or more characteristics of a cooling resource and/or manufacturing resource.

Accordingly, aspects of the present application relate to sustainability-aware computing device behavior management. In examples, a sustainability platform provides a sustainability forecast to a computing device. The sustainability forecast may be generated based on a location of the computing device, which may thus be used to determine an associated energy grid and/or grid region. The computing device may then use the sustainability forecast to schedule software execution, control battery charging, and/or manage any of a variety of other device functionality.

In examples, the sustainability platform aggregates sustainability information from one or more data providers. Each data provider may provide sustainability information for one or more energy grids and/or grid regions thereof. Thus, the sustainability platform may aggregate the sustainability information from multiple data providers to generate sustainability information that has better coverage than may otherwise be available from a single data provider. Similarly, multiple data providers may be used for the purpose of redundancy, among any of a variety of additional or alternative purposes. In other examples, at least a part of the sustainability information processed by the sustainability platform may be obtained, determined, or otherwise generated by the sustainability platform itself. Thus, in some instances, the sustainability platform may itself operate at least in part as a data provider.

The sustainability platform may normalize the sustainability information. For example, sustainability information within a given region may be normalized to be within a predetermined range (e.g., from 0-1; from 0-100; or characterized as bad, average, or good), such that one or more energy characteristics within a region are comparable to energy characteristics of another region. Using carbon intensity as an example, the actual carbon intensity range of the first region (e.g., from an actual minimum carbon intensity to an actual maximum carbon intensity) may be below the actual carbon intensity range of the second region, such that even the actual minimum carbon intensity of the second region is greater than the actual maximum carbon intensity for the first region. Even so, variability within each region (e.g., between each respective maximum and minimum) may enable aspects of the present disclosure to improve or alter the environmental impact of a computing device regardless of the actual magnitude, such that normalized sustainability information provides an indication as to a relative difference of one or more environmental characteristics for a given time period.

In examples, the sustainability platform generates a sustainability forecast for one or more energy characteristics associated with a region. For example, the sustainability forecast may be for the next 24 hours, for the next three days, for the next seven days, or for the next month. The sustainability forecast may be generated based at least in part on historical sustainability information and/or a variety of factors (e.g., environmental factors such as weather, temperature, or season, or grid factors such as energy demand, a mix of available energy sources, or energy generation capacity). In some examples, the forecast is generated based at least in part on a forecast obtained from a data provider, for example in order to refine the forecast or to extend the forecast beyond a time period provided by the data provider. It will be appreciated that any of a variety of forecasting techniques may be used, including, but not limited to, statistical modeling and/or machine learning techniques.

The time period for which a forecast is generated may vary according to a region for which the forecast is generated. For example, for a region where sustainability information is relatively consistent (e.g., exhibiting an hour-to-hour and/or day-to-day variability below a predetermined threshold), a longer period of time may be used as compared to a region having greater variability. Similarly, as discussed in greater detail below, a computing device in the first region may cache a forecast for a longer amount of time as compared to a computing device in the second region. Thus, the sustainability forecast generated or otherwise provided by the sustainability platform may account for regional differences in the magnitude and/or variability of the associated sustainability information. In examples, a sustainability forecast may include a confidence associated with one or more forecasted energy characteristics.

A computing device requests a sustainability forecast from a sustainability platform. The sustainability request may include location information associated with the computing device (e.g., as may be obtained from a global positioning system (GPS) sensor or using assisted GPS (AGPS) when permitted by a user, among other examples). In another example, the sustainability platform may determine a location for the computing device, for example based on an Internet Protocol (IP) address associated with the sustainability forecast request received from the computing device. In some instances, a sustainability platform may service a region of computing devices, such that a location and/or associated energy grid region need not be determined and the associated region may instead be used.

In examples, the sustainability forecast request includes an indication as to a time period for which the sustainability forecast is requested. As another example, the sustainability platform may determine the time period for which a sustainability forecast will be provided. The computing device may cache the sustainability forecast for the time period, thereby potentially reducing the amount of sustainability forecast requests that is received in aggregate from a population of computing devices that implement aspects described herein. In other examples, such caching may not be used.

Functionality of the computing device may be managed according to the obtained sustainability forecast. For example, a task scheduler may use the sustainability forecast as a signal (e.g., including one or more forecasted energy characteristics and, in some examples, an associated confidence level) when determining when to schedule a task of the computing device. As an example, the task scheduler may determine a time in which carbon intensity is comparatively low (e.g., within a given time period, such as an hour within a 24-hour period), such that the task may be scheduled to be performed during that time.

It will be appreciated that the task scheduler may evaluate any of a variety of additional signals when scheduling a task, including, but not limited to, an amount of other tasks to schedule, task priority, and resource utilization associated with the task. In examples, a task having a higher resource utilization may be prioritized to be performed at the identified time over a task having a lower resource utilization, as performing the task having the lower resource utilization may have a comparatively lower impact when instead performed at a time that is forecasted to have worse energy characteristics. Example tasks include, but are not limited to, search indexing, downloading and/or installing software updates, performing a backup, or charging a battery of the computing device.

Turning to the example of device charging, aspects of the present disclosure may be used to shift device charging to a time having a comparatively lower impact based on a sustainability forecast. In examples, a computing device may be operated on battery power when it is determined that the sustainability forecast indicates a comparatively higher energy associated with drawing from the energy grid. Later, the computing device may subsequently shift away from battery power when the impact associated with energy grid use decreases. Thus, a battery of the computing device may be used to "bridge" at least a part of the energy consumption of the computing device across periods of time where energy grid use has a comparatively higher environmental impact. As another example, at least a party of battery charging may be deferred based on a sustainability forecast to a time having a comparatively lower impact. In a further example, a part of the energy consumption of the computing device may be shifted to battery power, such that energy consumption below a predetermined threshold is still drawn from the energy grid so as to prolong the availability of battery power.

A computing device may have an associated peripheral device, such that usage and/or behavior of the peripheral device is similarly managed based at least in part on a sustainability forecast. For example, external storage may be used for storing periodic device backups. During a period of comparatively high impact, the external storage may be put into a lower power state and/or backups may be deferred until the forecasted impact associated with energy grid use decreases.

It will be appreciated that external storage is provided as one example of a peripheral device and similar techniques may be used for any of a variety of other peripheral devices, including, but not limited to, computer monitors (e.g., entering a lower brightness mode during a period of high impact) and printers (e.g., where printing may be temporarily deferred).

A sustainability application programming interface (API) may be provided (e.g., by an operating system (OS) of the device), which may be used by software executing on the device to control associated behavior. The sustainability API may enable access to a cached sustainability forecast (e.g., as may be obtained from a sustainability platform). In an example, software of the computing device may generate an API call to request at least a part of a sustainability forecast associated with a specified period of time, such as a 24-hour or 7-day time period. Thus, the computing device may obtain a sustainability forecast from a sustainability platform for a time period that is greater than the specified time period that is requested via the API call. In examples, the API call may specify a granularity for the requested sustainability forecast. As another example, a default granularity may be used (e.g., having forecast entries on an hourly or a daily basis).

In some instances, a forecast provided at a computing device (e.g., for use by a task scheduler or in response to an API call) may include one or more entries that indicate a lower impact than was forecasted by the sustainability platform. For example, the forecast API may be configured to ensure that an adequate amount of time (e.g., above a predetermined threshold) is available for various device functionality, such that a sustainability forecast having a number of entries below the predetermined threshold may be processed to identify and adjust a set of entries accordingly. An API call may specify a minimum number of comparatively good entries that should be returned as part of a sustainability forecast request.

In examples, a computing device may determine to invalidate a cached sustainability forecast such that an updated forecast is requested from a sustainability platform. For example, the computing device may determine that the forecast has expired (e.g., as a result of a time period for the forecast or based on an expiration time set by the sustainability platform). As another example, the computing device may invalidate the cached sustainability forecast in response to a change in device location. For example, a location change may be identified based on a change to the time zone of the computing device, a change in the IP address of the device (or geolocation information associated therewith), or a change indicated by GPS/AGPS that exceeds a predetermined threshold (e.g., a radius or geofence).

In another example, the cache may be invalidated in response to an indication received from a sustainability platform, such that the sustainability platform may effectively push an updated sustainability forecast to a computing device. Thus, while examples are described in a context where a sustainability forecast is used to affect computing device behavior, similar techniques may be used in response to an updated forecast and/or based on substantially real-time sustainability information (e.g., as may be obtained from a sustainability platform). In such examples, deferred behavior may be performed sooner or may be further deferred in response to updated sustainability information.

It will be appreciated that the disclosed techniques may be applied to any of a variety of computing devices, including, but not limited to, mobile computing devices, tablet computing devices, laptop computing devices, desktop computing devices, server computing devices, and Internet-of-Things (IoT) computing devices. For example, an IoT computing device may schedule a periodic processing activity (e.g., data aggregation and/or summarization) based on a sustainability forecast according to aspects described herein. As another example, a peripheral device may perform functionality management based on a sustainability forecast, as may be obtained from a host computing device or more directly from a sustainability platform.

Thus, aspects of the present disclosure enable device functionality to be adapted, shifted, or otherwise managed according to forecasted characteristics of an energy grid associated with the device. It will be appreciated that, in some examples, such aspects may be different from energy conservation considerations, where, for example, energy consumption by a device is reduced or minimized. By comparison, aspects of the present disclosure may instead shift at least a part of such energy consumption to another point in time, such that the aggregate energy consumption associated with given device functionality may be the same or greater than a device that offers similar functionality but does not implement the disclosed aspects.

While examples are described with respect to an energy grid, it will be appreciated that similar techniques may be used for alternate energy sources. For example, an individual or an organization may operate a generator or utilize solar energy to obtain at least a part of the energy used by a computing device. In such examples, a device may be configured to incorporate these and other energy sources into a sustainability forecast, for example to override sustainability information associated with an energy grid.

As another example, an organization may operate a sustainability platform that integrates alternate energy sources into sustainability information obtained from other sources (e.g., a data provider and/or another sustainability platform). Computing devices of the organization may obtain sustainability information from the organizational sustainability platform (e.g., when the computing device is located on the premise of the organization. Similar techniques may be applied for residential settings or cities, among other examples.

FIG. 1 illustrates an overview of an example system 100 for computing device behavior management according to aspects described herein. As illustrated, system 100 includes sustainability platform 102, computing device 104, data provider 106, and network 108. Sustainability platform 102, computing device 104, and data provider 106 are illustrated as communicating via network 108, which may comprise a local area network, a wireless network, or the Internet, or any combination thereof, among other examples.

Sustainability platform 102 may obtain sustainability information from data provider 106. For example, data provider 106 may be associated with one or more energy grids or may itself obtain information from one or more energy grids and use the obtained information to provide sustainability information accordingly. As noted above, the sustainability information provided by data provider 106 may relate to any of a variety of energy characteristics of one or more energy grids, such as carbon intensity and/or what percentage of the available energy is generated by renewable sources, among other examples.

While system 100 is illustrated as having one data provider 106, it will be appreciated that any number of data providers may be used in other examples. For example, multiple data providers may be used to obtain sustainability information for different energy grids and/or grid regions, or to achieve redundancy in the event one such data provider is unavailable. In another example, data provider 106 may be omitted, as may be the case when sustainability platform 102 generates or otherwise obtains sustainability information itself (e.g., as a result of more direct communication with an energy grid or based on data obtained from any of a variety of other sources).

Sustainability platform 102 is illustrated as comprising request processor 110, region determination engine 112, sustainability data manager 114, forecasting engine 116, and sustainability data store 118. In examples, aspects of sustainability platform 102 may be included as part of any of a variety of services or other platforms, such as part of an update service or a diagnostics platform. Sustainability data manager 114 obtains and processes sustainability information according to aspects described herein, for example to aggregate and/or normalize the sustainability information. As an example, sustainability data manager 114 obtains sustainability information from data provider 106.

Sustainability data manager 114 may identify a subpart of sustainability information associated with a specific energy grid or grid region. For example, sustainability information for a given energy grid and/or grid region is processed to normalize the data accordingly. As another example, sustainability data manager 114 may combine sustainability information from data provider 106 with sustainability information from another data provider (not pictured), for example to account for gaps in the sustainability information obtained from data provider 106. The sustainability information (which may have been normalized as described herein) may be stored in sustainability data store 118. In examples, the sustainability information is stored in association with an energy grid and/or grid region, thereby enabling later retrieval based on a grid or grid region associated with a location of a computing device.

Sustainability platform 102 further comprises forecasting engine 116, which processes sustainability information (e.g., as may be stored by sustainability data store 118) to generate a sustainability forecast. In examples, the sustainability information obtained by sustainability data manager 114 includes a sustainability forecast for an energy grid or grid region, such that forecasting engine 116 need not generate a forecast or may instead generate an extended forecast based on the obtained forecast and/or other sustainability information.

It will be appreciated that any of a variety of forecasting techniques may be used, including, but not limited to, statistical modeling and/or machine learning. For example, a machine learning model may be trained based on annotated training data comprising historical sustainability information that is annotated using information associated with a variety of other factors (e.g., environmental factors and grid factors). As a result, the machine learning model may be used to predict energy characteristics according to forecasted environmental and/or grid factors. As another example, statistical modeling may be used based on historical information of a similar time period to the time period for which forecasting engine 116 is generating a forecast (e.g., a similar day in one or more past weeks or a similar month in one or more past years). It will further be appreciated that a combination of these and other techniques may be used. One or more forecasted factors may have an associated confidence level in some examples.

Request processor 110 receives and processes sustainability forecast requests (e.g., as may be received from computing device 104). In examples, a received sustainability forecast request includes an indication of a location (e.g., as may be determined by the computing device). In another example, a location associated with the sustainability forecast request may be determined based on an IP address associated with the request.

Region determination engine 112 may identify an energy grid or grid region associated with the sustainability forecast request. For example, region determination engine 112 may identify a mapping between a geographic area associated with the location of the sustainability forecast request and a grid region, such that the identified grid region is used when processing the sustainability forecast request.

Accordingly, request processor 110 may provide a sustainability forecast associated with the region determined by region determination engine 112 in response to the received sustainability forecast request. In examples, request processor 110 provides a sustainability forecast for a predetermined time period or for a time period specified by the sustainability forecast request. In another example, the response may include an indication as to an expiration date, after which the computing device is to request a new sustainability forecast. Providing the sustainability forecast may comprise accessing the sustainability forecast from sustainability data store 118 or, in some instances, at least a part of the sustainability forecast may be generated in response to the request based on sustainability information stored by sustainability data store 118.

System 100 also includes computing device 104, which may be any of a variety of devices, including, but not limited to, a mobile computing device, a tablet computing device, a laptop computing device, a desktop computing device, a server computing device, or an IoT computing device. As illustrated, computing device 104 includes sustainability manager 120, sustainability-aware scheduler 122, and sustainability-aware application 124.

Sustainability manager 120 may obtain and cache a sustainability forecast (e.g., from sustainability platform 102) according to aspects described herein. In examples, sustainability manager 120 may request an updated sustainability forecast as a result of determining a cached forecast has expired or has been invalidated. In examples, sustainability manager 120 obtains a sustainability forecast according to a predetermined schedule. In instances where sustainability information is relatively constant (e.g., having a variability below a predetermined threshold), sustainability manager may receive a sustainability forecast that is for a longer period of time as compared to instances where the sustainability information is not relatively constant. For example, sustainability manager 120 may receive a sustainability forecast for a 30-day or 7-day period in the first instance and may instead receive a sustainability forecast for a 3-day period or 24-hour period in the second instance.

In examples, sustainability manager 120 provides an API with which to access the cached sustainability forecast, as may be used by sustainability-aware scheduler 122 and/or sustainability-aware application 124. In other examples, sustainability manager 120 may generate notifications associated with a sustainability forecast (e.g., according to a predetermined schedule or in response to changes in one or more energy characteristics), such that software may subscribe to receive forecast notifications and adapt its behavior accordingly. For example, sustainability manager 120 may generate a notification on a periodic basis and/or when it is determined that a carbon intensity has improved or diminished (e.g., according to a cached sustainability forecast, an update to a sustainability forecast, or based on substantially real-time sustainability information), among other examples.

Sustainability-aware scheduler 122 may manage any of a variety of device functionality, including, but not limited to, search indexing, downloading and/or installing software updates, performing a backup, or charging a battery of the computing device. In examples, sustainability-aware scheduler 122 obtains a sustainability forecast from sustainability manager 120 (e.g., as a result of a notification generated by sustainability manager 120 or via an API call). The obtained forecast may be for a time period for which sustainability-aware scheduler 122 is scheduling tasks, such as for a 24-hour or 7-day period. Sustainability-aware scheduler 122 may thus use the sustainability forecast as a signal when scheduling tasks, such that certain tasks may be scheduled at a time having a comparatively reduced impact as compared to other candidate times. In examples, sustainability-aware scheduler 122 evaluates the sustainability forecast signal for background and/or low priority tasks, while higher priority and/or user-related tasks may not be scheduled based on one more sustainability signals.

In some instances, user input may be received to temporarily disable sustainability-aware scheduling. For instance, the user may indicate that a battery of computing device 104 is to be charged in preparation for a trip or another period of time where computing device 104 will be on battery power. As another example, the user may indicate that search indexing or other computing functionality is to be completed as a result of the user needing such functionality on a more immediate basis. In another example, a notification may be presented that a task is being deferred based on a sustainability forecast. In such an example, user input may be received to override sustainability-aware scheduling. In some instances, user input (or lack thereof) may be identified to indicate acceptance of such task deferral.

Computing device 104 is further illustrated as including sustainability-aware application 124, which may use an API provided by sustainability manager 120 to adapt its functionality according to a sustainability forecast as described herein. For example, sustainability-aware application 124 may obtain a sustainability forecast and use the obtained forecast to defer performance of one or more tasks according to the forecast. It will thus be appreciated that any of a variety of device functionality (e.g., relating to hardware and/or software) may be managed according to aspects described herein.

While system 100 is illustrated as having a single sustainability platform 102, a single computing device 104, and a single data provider 106, it will be appreciated that any number of sustainability platforms, computing devices, and/or data providers may be used in other examples. As an example, a sustainability platform may have an associated region, such that sustainability forecast requests received by the sustainability platform are assumed to be for the associated region and may be processed accordingly. For example, sustainability forecast requests may be directed to one of a set of sustainability platforms by a load balancer or other computing device, or as a result of domain name system (DNS) resolution, among other examples.

Figure 2:
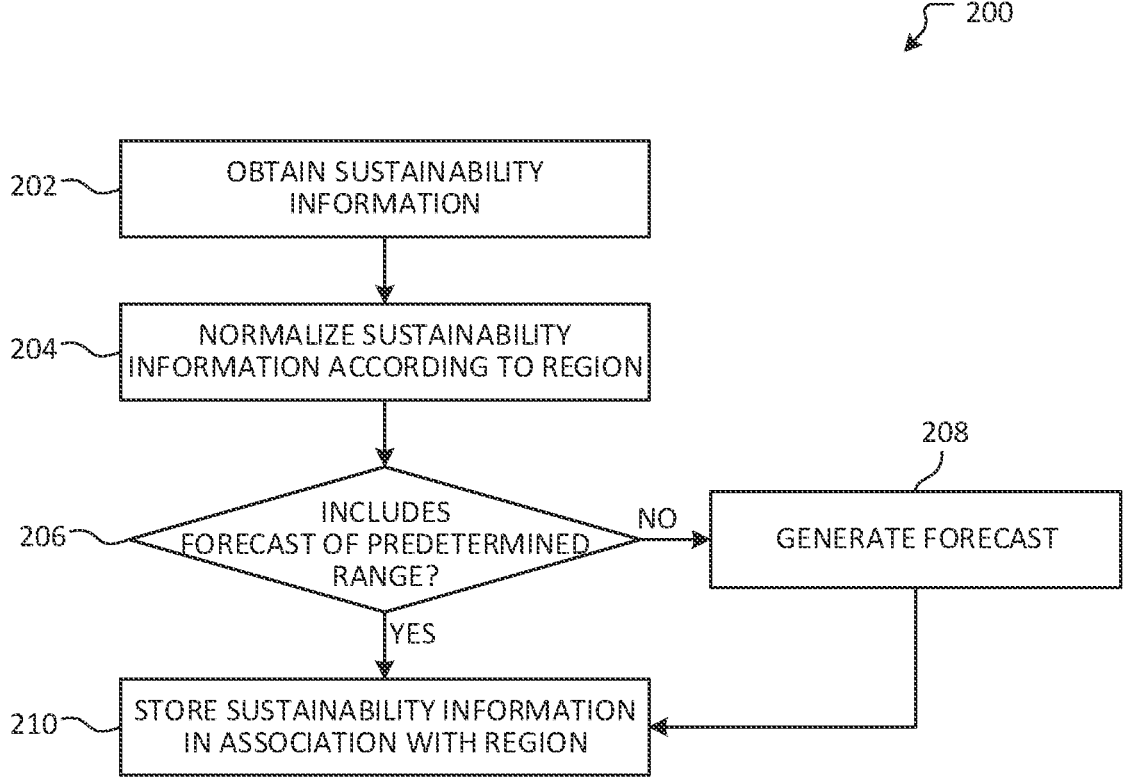
FIG. 2 illustrates an overview of an example method for aggregating and processing sustainability information at a sustainability platform.

FIG. 2 illustrates an overview of an example method 200 for aggregating and processing sustainability information at a sustainability platform. In examples, aspects of method 200 are performed by a sustainability platform, such as sustainability platform 102 discussed above with respect to FIG. 1. For example, a sustainability data manager and/or forecasting engine may perform such aspects, such as sustainability data manager 114 and/or forecasting engine 116.

Method 200 begins at operation 202, where sustainability information is obtained. For example, the sustainability information may be obtained from one or more data providers, such as data provider 106 discussed above with respect to FIG. 1. In another example, at least a part of the sustainability information may be generated by the sustainability platform or may be obtained from one or more devices associated with an energy grid, among other examples. Thus, it will be appreciated that sustainability information may be obtained from any of a variety of sources.

At operation 204, the sustainability information is normalized according to region. For example, the sustainability information may be processed to identify a set of regions associated therewith, such that the sustainability information for each identified region is normalized. As noted above, the sustainability information may be normalized according to one or more predetermined ranges, for example from 0-1 or 0-100, or from bad, average, to good. In another example, the sustainability information may be normalized according to one or more descriptive statistics associated with the sustainability information overall (e.g., such that an energy characteristic for a given region has the same statistic as another region). It will thus be appreciated that any of a variety of techniques may be used to normalize sustainability information. Further, operation 204 may be omitted in some instances, as may be the case when the obtained sustainability information is already normalized. As another example, normalization may be performed for regions in which the information is a statistical outlier as compared to a set of other regions.

At determination 206, it is determined whether the obtained sustainability information includes a forecast of at least a predetermined range. For instance, some data providers may provide a shorter term forecast or may not provide a forecast, such that it may be determined that the sustainability information does not include a forecast of at least the predetermined range. As an example, a data provider may provide a 24-hour or 7-day forecast, while the predetermined range may be seven days or 30 days, respectively. It will be appreciated that the predetermined range may vary by region, as certain regions may exhibit greater variability such that a shorter predetermined range may be used for forecasting.

If, at determination 206, it is determined that the sustainability information does not include a forecast of at least the predetermined range, flow branches "NO" to operation 208, where a forecast is generated. The forecast may be generated by a forecasting engine, such as forecasting engine 116 discussed above with respect to FIG. 1. As described above, any of a variety of forecasting techniques may be used, including, but not limited to, statistical modeling and/or machine learning. In some examples, the forecast generated at operation 208 may be generated based at least in part on a forecast that was obtained at operation 202, for example to refine the forecast or to extend the forecast beyond a time period covered by the forecast. Method 200 then progresses to operation 210 where the generated forecast is stored as part of the sustainability information, which is discussed in greater detail below.

Returning to determination 206, if it is instead determined that the sustainability information includes a forecast of at least the predetermined range, flow branches "YES" to operation 210, where the sustainability information is stored in association with a region for which the sustainability information was generated. For example, the sustainability information may be stored in a sustainability data store, such as sustainability data store 118 discussed above with respect to FIG. 1. The sustainability information may be stored using an associated region so as to enable later retrieval (e.g., by a request processor performing aspects of method 300 discussed below with respect to FIG. 3) based on a grid or grid region associated with a requesting computing device. Method 200 terminates at operation 210.

Figure 3:
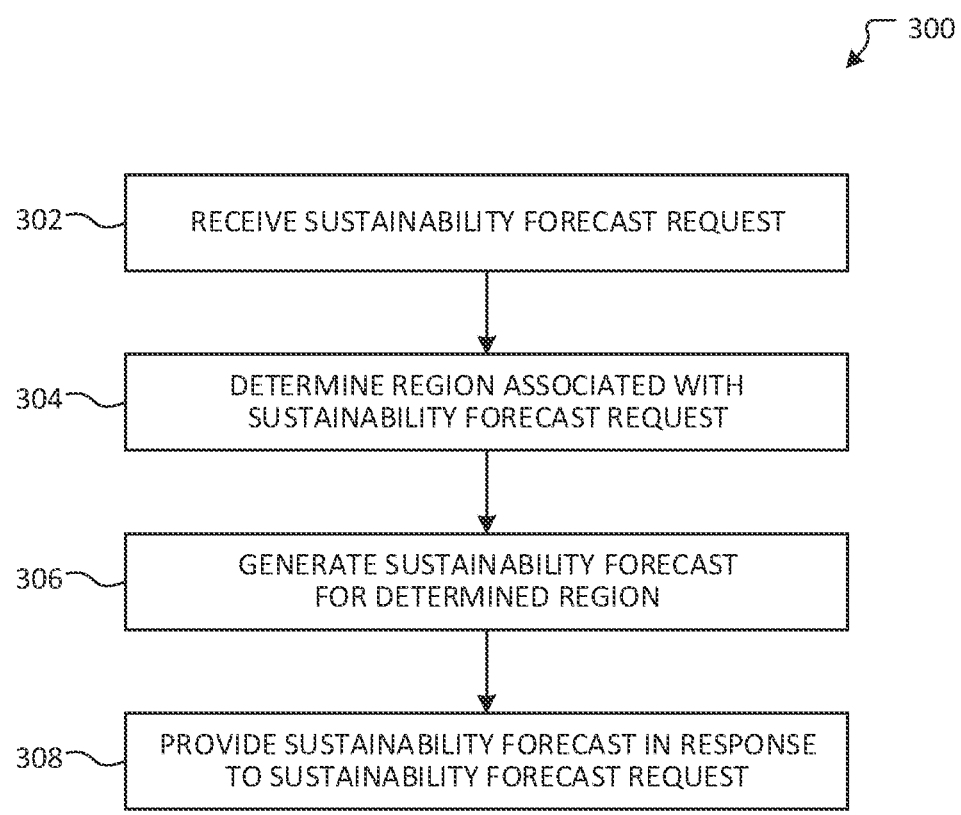
FIG. 3 illustrates an overview of an example method for generating and providing a sustainability forecast to a computing device in response to a sustainability forecast request.

FIG. 3 illustrates an overview of an example method 300 for generating and providing a sustainability forecast to a computing device in response to a sustainability forecast request. In examples, aspects of method 300 are performed by a sustainability platform, such as sustainability platform 102 discussed above with respect to FIG. 1. For example, a request processor and/or region determination engine may perform such aspects, such as request processor 110 and/or region determination engine 112.

Method 300 begins at operation 302, where a sustainability forecast request is received. For example, the sustainability forecast request may be received from a computing device, such as computing device 104 discussed above with respect to FIG. 1. The sustainability forecast request may comprise an indication of a location and/or a period of time for which a forecast is requested. In other examples, the sustainability forecast request includes an indication of an IP address (e.g., as a header of the request) associated with the computing device from which the sustainability forecast request was received.

Flow progresses to operation 304, where a region associated with the sustainability forecast request is determined. For example, the region may be determined by a region determination engine, such as region determination engine 112 discussed above with respect to FIG. 1. In examples, operation 304 comprises determining a location for the computing device based on an IP address of the sustainability forecast request. As discussed above, a mapping may be identified between a geographic area associated with the location of the sustainability forecast request (e.g., where the location is within a set of bounds of the geographic area) and a grid region, such that the identified grid region is used when processing the sustainability forecast request. In some examples, operation 306 may be omitted, as may be the case when method 300 is performed by a sustainability platform having an associated grid region, such that the associated grid region may instead be used to perform aspects of method 300 accordingly.

At operation 306, a sustainability forecast is generated for the determined region. For example, sustainability information may be accessed from a sustainability data store, such as sustainability data store 118 discussed above with respect to FIG. 1. The sustainability information may be accessed based on the determined region. As a result of performing aspects of method 200 discussed above with respect to FIG. 2, the accessed sustainability information may include a forecast. The sustainability forecast may be for a predetermined time period or for a time period specified by the sustainability forecast request. In some instances, at least a part of the sustainability forecast may be generated at operation 306 based on the accessed sustainability information, as may be the case when the sustainability information does not include a forecast having a time period that is at least a time period associated with the received sustainability forecast request.

Moving to operation 308, the sustainability forecast is provided in response to the sustainability forecast request. In examples, the sustainability forecast is provided in association with an expiration date. As noted above, the sustainability forecast may be provided according to a predetermined granularity or may be provided according to a granularity indicated by the sustainability forecast request that was received at operation 302. Method 300 terminates at operation 308.

Figure 4:
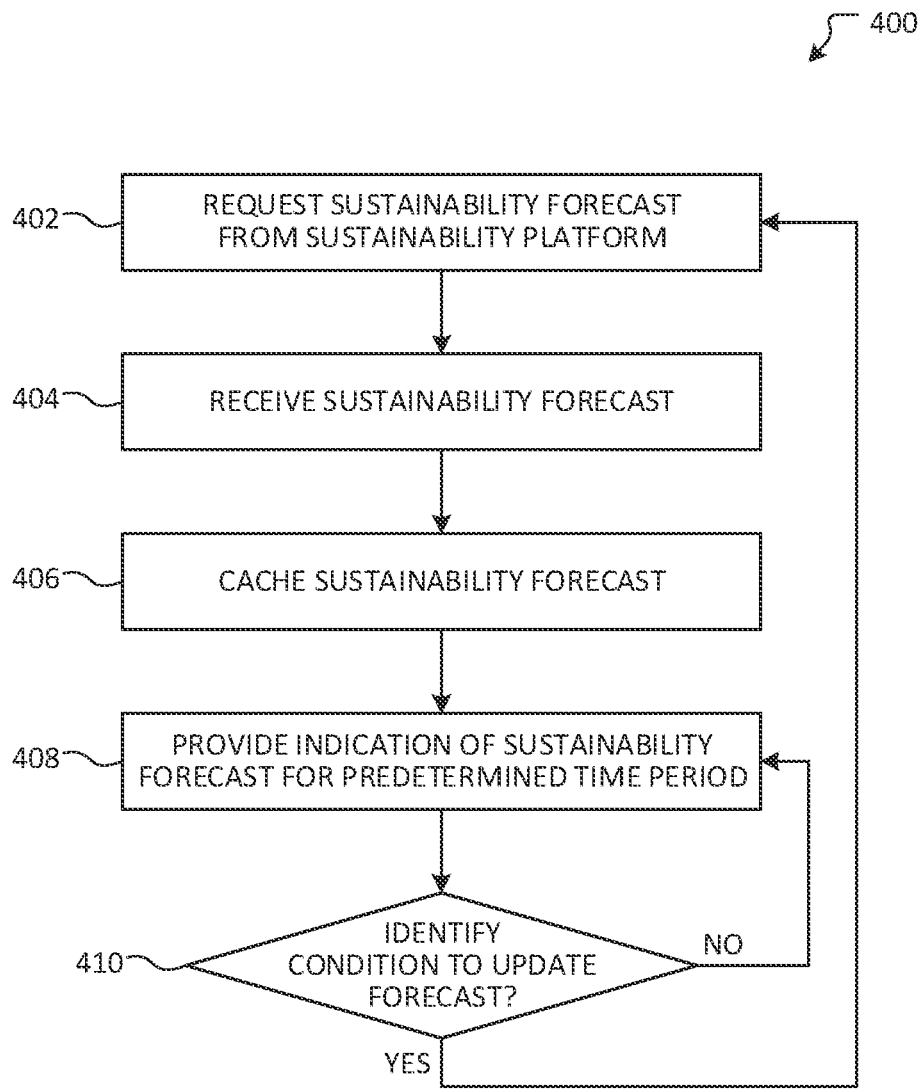
FIG. 4 illustrates an overview of an example method for obtaining and using a sustainability forecast from a sustainability platform.

FIG. 4 illustrates an overview of an example method 400 for obtaining and using a sustainability forecast from a sustainability platform. In examples, aspects of method 400 are performed by a computing device, such as computing device 104 discussed above with respect to FIG. 1. For instance, method 400 may be performed by a sustainability manager, such as sustainability manager 120.

Method 400 begins at operation 402, where a sustainability forecast is requested from a sustainability platform, such as sustainability platform 102 discussed above with respect to FIG. 1. In examples, the request includes a location of the computing device, as may be determined using GPS/AGPS when permitted by a user, among other examples. In some instances, the request includes an indication as to a time period and/or a granularity for the requested sustainability forecast. In some instances, operation 402 comprises determining a sustainability platform that will receive the request, as may be the case when a set of sustainability platforms are used, each of which has an associated geographic and/or grid region. For example, operation 402 may comprise resolving a hostname associated with the set of sustainability platforms.

At operation 404, a sustainability forecast is received. The sustainability forecast may be received as a result of the sustainability platform performing aspects of operation 308 discussed above with respect to method 300 of FIG. 3. For example, the sustainability forecast may include a number of entries for a period of time, such as hourly entries for a 7-day period or half-hour entries for a 24-hour period, among other examples. In examples, an entry and/or one or more energy characteristics associated therewith has an associated confidence level. In some instances, the sustainability forecast is received in association with an expiration date.

Flow progresses to operation 406, where the sustainability forecast is cached. For example, the sustainability forecast may be cached in memory or storage of the computing device. In examples, the sustainability forecast is cached in association with an expiration date (e.g., as may have been received at operation 404 or as may be determined based on a time period for which the forecast was generated).

Flow progresses to operation 408, where an indication of the sustainability forecast is provided for a predetermined time period. For example, the indication may be provided as a notification to one or more listeners in response to identifying a change in one or more energy characteristics of the sustainability forecast. As another example, the notification may be generated according to a predetermined schedule (e.g., hourly or minutely) and may include one or more energy characteristics from an entry of the sustainability forecast. In a further example, the indication may be provided in response to a request from software of the computing device, as may be the result of an API call, among other examples. It will be appreciated that any of a variety of techniques may be used to provide an indication associated with a sustainability forecast or, in other examples, operation 408 may be omitted. As noted above, the provided sustainability forecast may be modified to include a minimum number of comparatively good entries to ensure that an adequate amount of time (e.g., above a predetermined threshold) is available for various device functionality.

At determination 410, it may be determined whether there is a condition for which to update the sustainability forecast. Example conditions include, but are not limited to, an expiration of the forecast or an invalidation of the forecast, for example as a result of determining it is past the expiration date of the forecast, that a time zone of the device has changed, or that the location of the device has changed outside of a predetermined threshold. In another example, the identified condition may result from an indication received from a sustainability platform, such that the platform may effectively push an updated sustainability forecast to a device.

If it is not determined to update the forecast, flow branches "NO" and returns to operation 408, where another indication associated with the sustainability forecast is provided. Thus, method 400 may loop between operation 408 and determination 410 until it is determined to update the cached sustainability forecast. However, if it is determined to update the forecast, flow instead branches "YES" and returns to operation 402, which is discussed above. Thus, as a result of performing aspects of method 400, a sustainability forecast may be maintained at the device and used to manage the behavior of the device according to aspects described herein.

Figure 5:
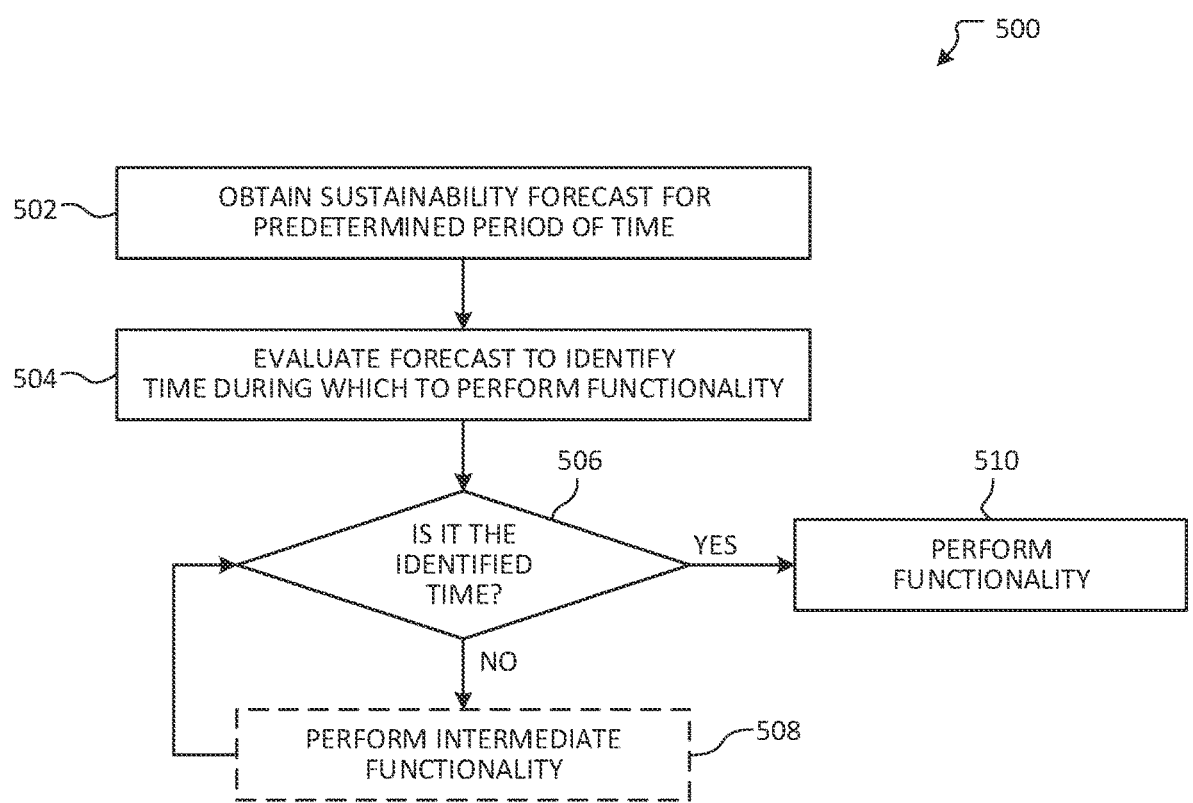
FIG. 5 illustrates an overview of an example method for managing the behavior of a computing device based on a sustainability forecast according to aspects described herein.

FIG. 5 illustrates an overview of an example method 500 for managing the behavior of a computing device based on a sustainability forecast according to aspects described herein. In examples, aspects of method 500 are performed by a computing device, such as computing device 104 discussed above with respect to FIG. 1. For instance, method 500 may be performed by a sustainability-aware scheduler or a sustainability-aware application, such as sustainability-aware scheduler 122 or sustainability-aware application 124.

Method 500 begins at operation 502, where a sustainability forecast is obtained for a predetermined period of time. For example, the sustainability forecast may be obtained from a sustainability manager, such as sustainability manager 120 of FIG. 1. The sustainability forecast may be obtained as a result of a notification generated by the sustainability manager or as a result of an API call to a sustainability manager API, among other examples. The sustainability forecast may include a set of entries (e.g., according to a predetermined or a requested granularity), each of which may include one or more forecasted energy characteristics. In examples, one or more energy characteristics may have an associated confidence score, which may similarly be processed as a signal according to aspects described herein.

At operation 504, the sustainability forecast is evaluated to identify a time during which to perform functionality (e.g., of a device or of an application). For example, the forecast may be evaluated in view of an estimated time associated with the functionality to determine a contiguous time period during which to perform the functionality having a lower or the lowest forecasted impact. In another example, operation 504 may determine a set of times, as may be the case for a task that can be segmented or paused/resumed across multiple periods of time. Thus, it will be appreciated that any of a variety of techniques may be used to identify a time during which to perform functionality at operation 504.

In some examples, operation 504 comprises presenting a notification that functionality of the computing device will be deferred to the identified time. User input may be received to accept or reject the deferral. In some instances, a lack of user input may be determined to indicate user acceptance of the deferral or may be determined to indicate rejection of the deferral, as may be configured by a user of the computing device. In an example, a user may indicate that a task is to automatically be deferred in response to explicit approval and not deferred in the absence of approval, or vice versa. As another example, a user may specify a set of "working" or "non-working" hours and associated behaviors for each (e.g., tasks are not to be automatically deferred during working hours but may be automatically deferred during non-working hours, either with or without an associated notification or other indication). Any of a variety of additional or alternative timeframes may be used. In examples where user input is received to reject the functionality deferral, the functionality may be performed subsequent to receipt of the user input (e.g., similar to aspects described below with respect to operation 510). An example user interface with which an indication may be presented is discussed below with respect to FIG. 6.

At determination 506, it is determined whether it is the time that was identified at operation 504. If it is determined that it is not the identified time, method 500 branches "NO" to operation 508, where intermediate functionality may be performed. For example, the intermediate functionality may be an alternative to the target functionality for which the forecast was evaluated but may prepare the computing device to perform the target functionality or may achieve the target functionality in a way that has a lower sustainability impact. Examples of intermediate functionality include, but are not limited to, downloading an update in preparation for the target functionality of installing the update or utilizing battery power rather than the target functionality of charging the device.

Operation 508 is illustrated using a dashed box to indicate that, in some examples, operation 508 may be omitted. For example, the target functionality may be scheduled for the identified time and intermediate functionality may not be performed in the interim. An arrow from operation 508 to determination 506 is illustrated to indicate that, eventually it may instead be determined to perform the target functionality at operation 510, which is described below.

Returning to determination 506, if it is instead determined that it is the identified time, method 500 branches "YES" to operation 510, where the functionality is performed. In examples, operation 510 may comprise suspending the functionality when it is determined that the identified time has ended, such that the functionality may be resumed at a later time (e.g., when the sustainability forecast again indicates a reduced impact). In other examples, the performed functionality may begin during a time of reduced impact and may continue until completion. Thus, it will be appreciated that functionality may be performed in view of a sustainability forecast according to any of a variety of techniques. Method 500 terminates at operation 510.

Figure 6:
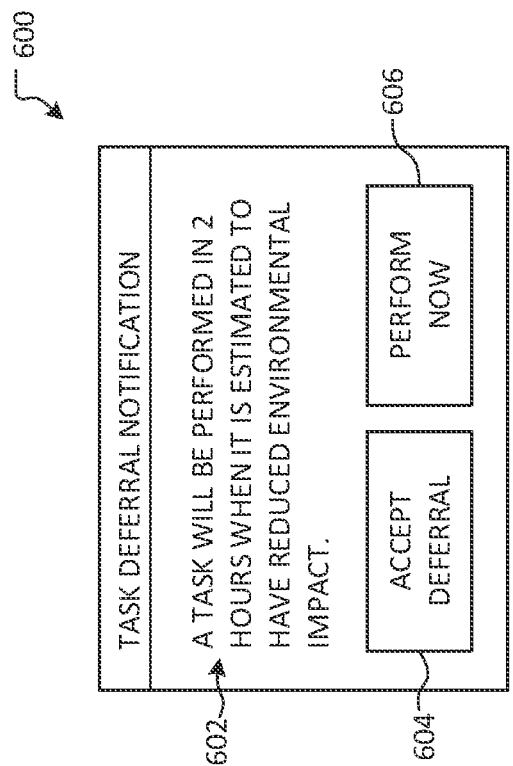
FIG. 6 illustrates an overview of an example user interface for providing a notification of functionality deferral according to aspects described herein.

FIG. 6 illustrates an overview of an example user interface 600 for providing a notification of functionality deferral according to aspects described herein. In examples, user interface 600 may be presented in response to determining to schedule functionality of a computing device according to a sustainability forecast, for example as a result of performing aspects of method 500 in FIG. 5.

As illustrated, user interface 600 includes message 602, accept button 604, and reject button 606. In examples, message 602 includes an indication of functionality that will be performed and an indication of a time identified during which to perform the functionality (e.g., an actual time or in relative terms). As discussed above, a user may actuate accept button 604 to permit the functionality to be scheduled at a later time, or may actuate reject button 606 to indicate that the functionality should be performed now, soon, or as the functionality would otherwise be performed in the absence of the information provided by the sustainability forecast. While example user interface aspects are described, it will be appreciated that a variety of alternative user experience paradigms may be used in other examples. For instance, aspects similar to FIG. 6 may be used to provide an indication of automatic deferral (e.g., where at least accept button 604 may be omitted) or an indication may not be presented. As another example, a user may configure such notifications or may indicate that certain functionality can always be deferred or should never be deferred, among other examples.

FIGS. 7-10 and the associated descriptions provide a discussion of a variety of operating environments in which aspects of the disclosure may be practiced. However, the devices and systems illustrated and discussed with respect to FIGS. 7-10 are for purposes of example and illustration and are not limiting of a vast number of computing device configurations that may be utilized for practicing aspects of the disclosure, described herein.

Figure 7:
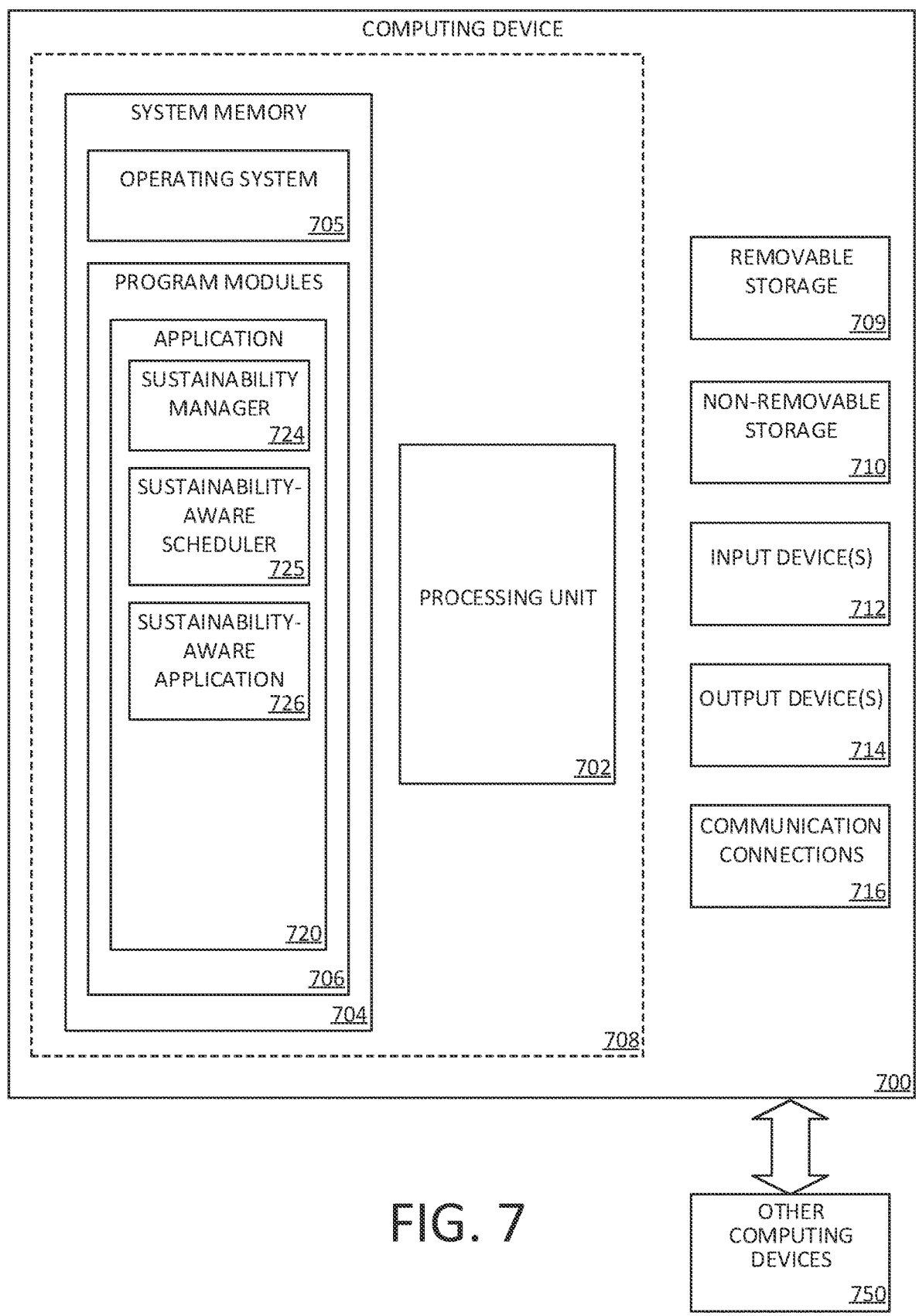
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above, including devices 102, 104, and/or 106 in FIG. 1. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories.

The system memory 704 may include an operating system 705 and one or more program modules 706 suitable for running software application 720, such as one or more components supported by the systems described herein. As examples, system memory 704 may store sustainability manager 724, sustainability-aware scheduler 725, and sustainability-aware application 726. The operating system 705, for example, may be suitable for controlling the operation of the computing device 700.

Furthermore, embodiments of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 (e.g., application 720) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 700 may also have one or more input device(s) 712 such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
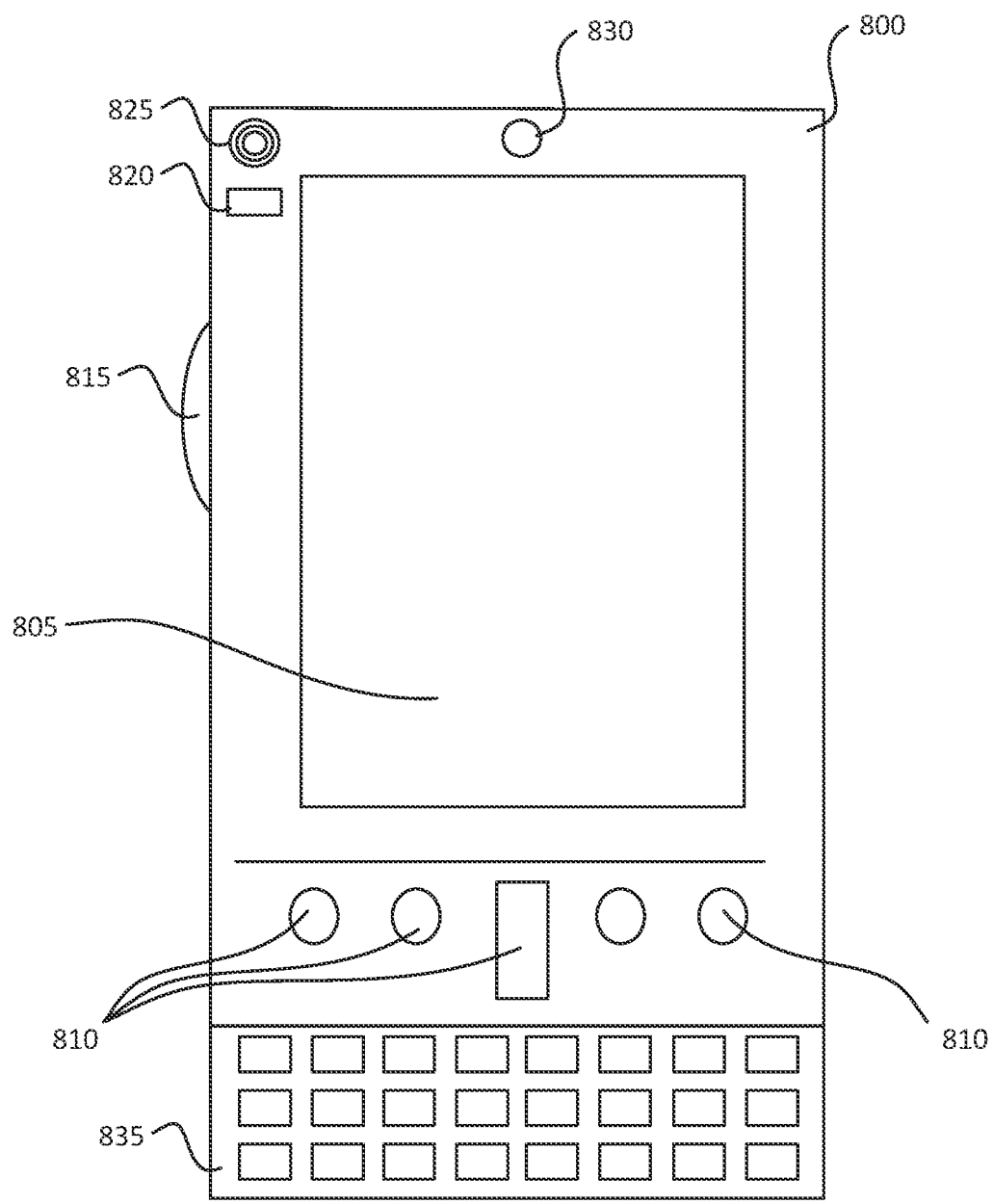
FIGS. 8A and 8B are simplified block diagrams of a mobile computing device with which aspects of the present disclosure may be practiced.
Figure 8B:
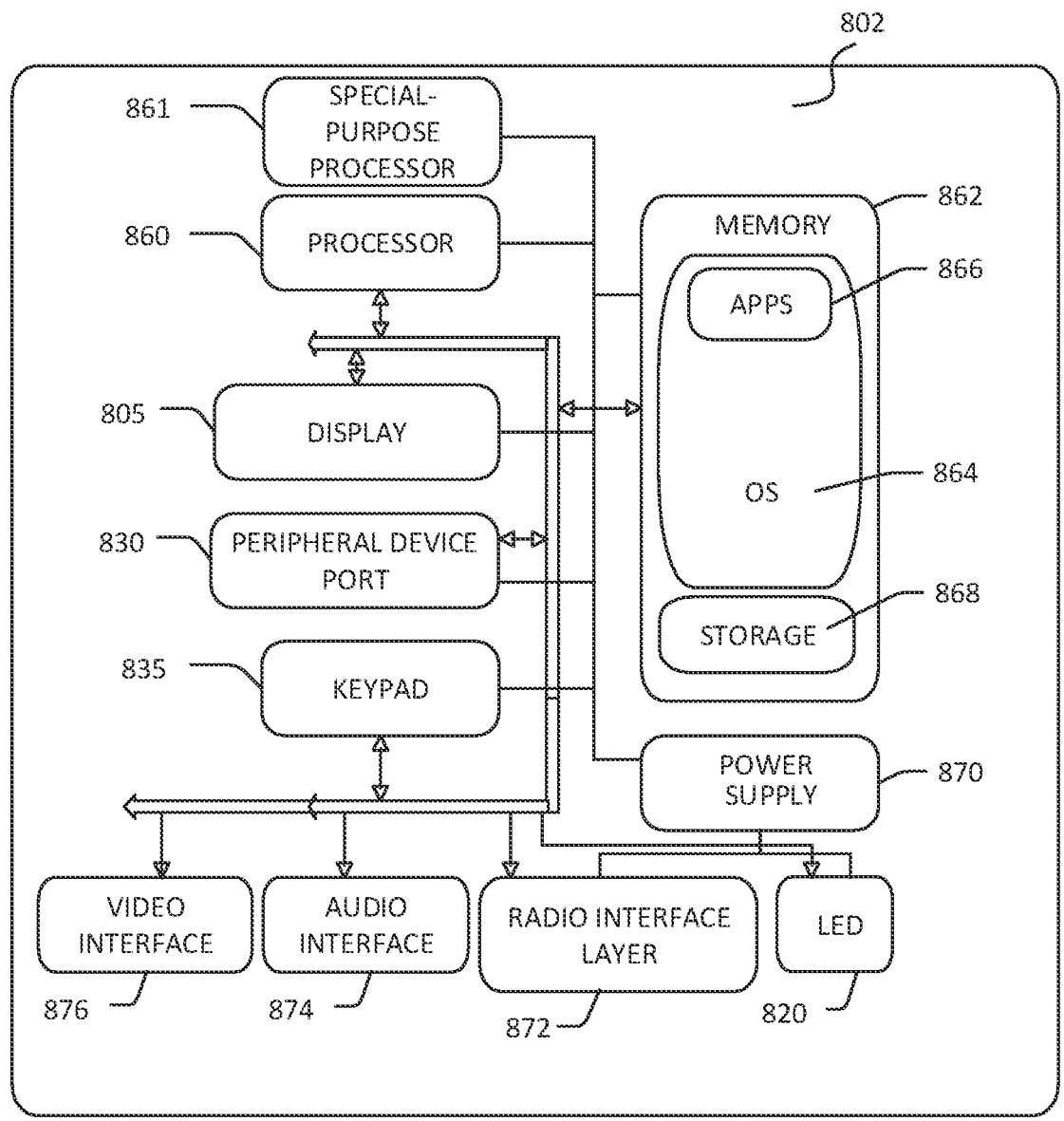

FIGS. 8A and 8B illustrate a mobile computing device 800, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display).

If included, an optional side input element 815 allows further user input. The side input element 815 may be a rotary switch, a button, or any other type of manual input element. In alternative aspects, mobile computing device 800 may incorporate more or less input elements. For example, the display 805 may not be a touch screen in some embodiments.

In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display.

In various embodiments, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile computing device. That is, the mobile computing device 800 can incorporate a system (e.g., an architecture) 802 to implement some aspects. In one embodiment, the system 802 is implemented as a "smart phone" capable of running one or more applications (e.g., browser, e-mail, calendaring, contact managers, messaging clients, games, and media clients/players). In some aspects, the system 802 is integrated as a computing device, such as an integrated personal digital assistant (PDA) and wireless phone.

One or more application programs 866 may be loaded into the memory 862 and run on or in association with the operating system 864. Examples of the application programs include phone dialer programs, e-mail programs, personal information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein (e.g., a sustainability manager, a sustainability-aware scheduler, a sustainability-aware application, a sustainability data manager, etc.).

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 may be used to provide visual notifications, and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

Figure 9:
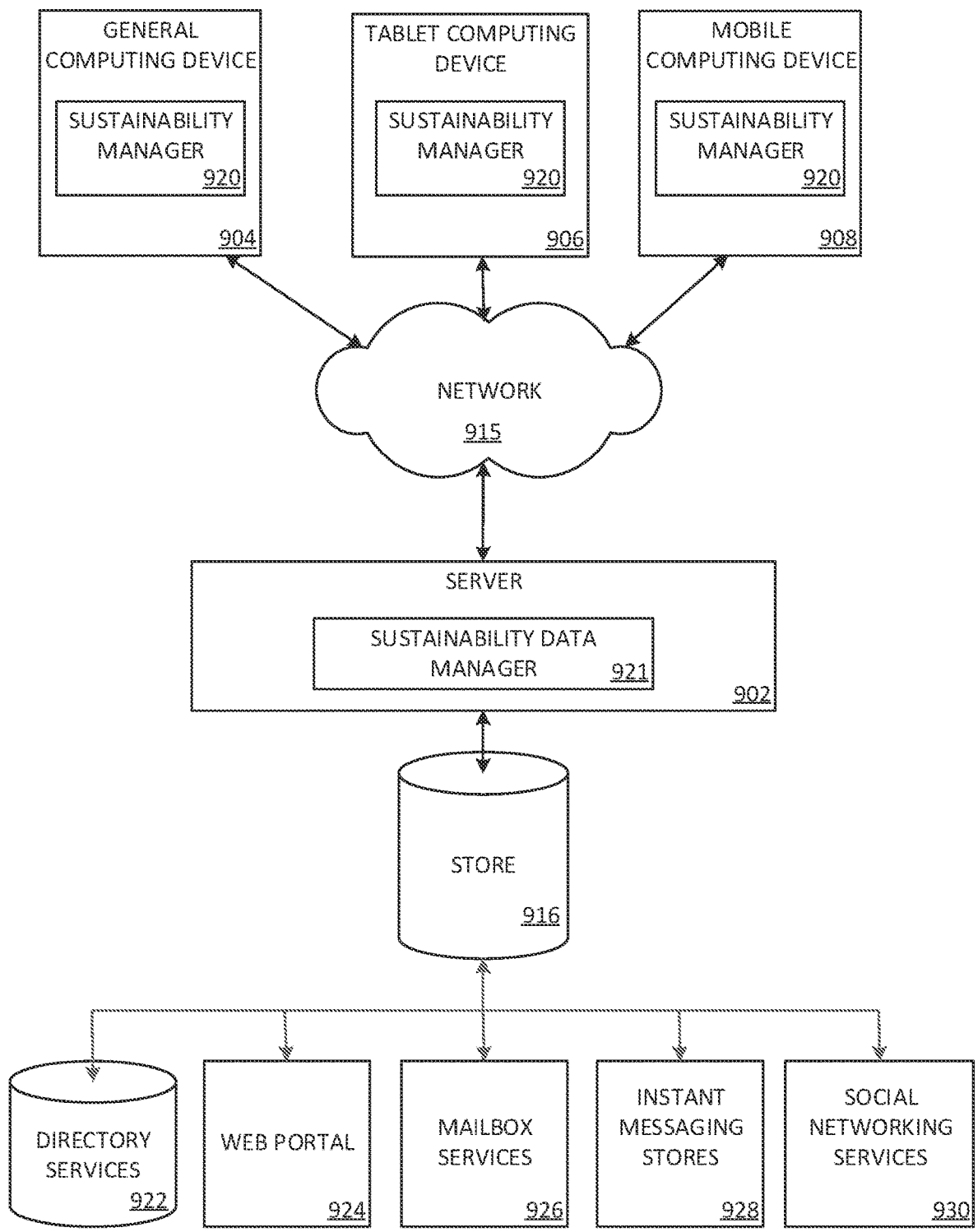
FIG. 9 is a simplified block diagram of a distributed computing system in which aspects of the present disclosure may be practiced.

FIG. 9 illustrates one aspect of the architecture of a system for processing data received at a computing system from a remote source, such as a personal computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930.

A sustainability manager 920 may be employed by a client that communicates with server device 902, and/or sustainability data manager 921 may be employed by server device 902. The server device 902 may provide data to and from a client computing device such as a personal computer 904, a tablet computing device 906 and/or a mobile computing device 908 (e.g., a smart phone) through a network 915. By way of example, the computer system described above may be embodied in a personal computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Figure 10:
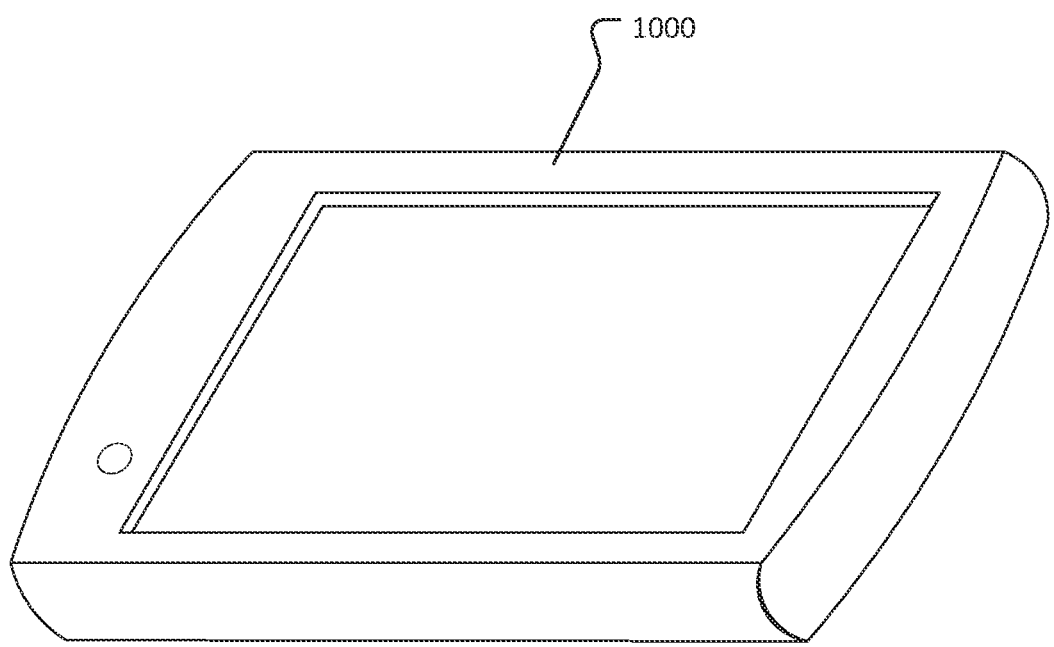
FIG. 10 illustrates a tablet computing device for executing one or more aspects of the present disclosure.

FIG. 10 illustrates an exemplary tablet computing device 1000 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: obtaining a sustainability forecast including a set of estimated energy characteristics for an energy grid associated with the system; evaluating the sustainability forecast to determine a time to perform functionality of the system, wherein the determined time has an associated energy characteristic that indicates a lower estimated impact than an energy characteristic associated with another time; and scheduling the functionality to be performed at the determined time. In an example, the set of operations further comprises: performing intermediate functionality associated with the scheduled functionality prior to the determined time. In another example, the sustainability forecast is obtained from a sustainability platform based on a location associated with the system. In a further example, the sustainability forecast is for a predetermined time period; and the set of operations further comprises: obtaining an updated sustainability forecast based on determining the predetermined time period has elapsed. In yet another example, the set of operations further comprises: determining a location of the system has changed; and in response to determining the location has changed, obtaining an updated sustainability forecast. In a further still example, the set of operations further comprises: presenting, to a user of the system, a notification that the functionality will be performed at the determined time; identifying user acceptance associated with the notification; and in response to the identified user acceptance, scheduling the functionality to be performed at the determined time. In another example, identifying the user acceptance includes one of: receiving user actuation of an accept button of the notification; or identifying a predetermined amount of time has elapsed during which user input associated with a reject button of the notification was not received. In a further example, the functionality of the system includes one or more of: indexing storage of the system; downloading a software update; installing the software update; performing a backup; or charging a battery of the system.

In another aspect, the technology relates to a method for generating a sustainability forecast for a computing device. The method comprises: receiving, from the computing device, a sustainability forecast request; determining a location associated with the computing device; generating a sustainability forecast for an energy grid associated with the location, wherein the sustainability forecast comprises a set of entries and each entry indicates an estimated energy characteristic associated with the location for a period of time; and providing, in response to the received sustainability forecast request, the generated sustainability forecast. In an example, the method further comprises: obtaining sustainability information from a data provider; and processing the sustainability information to generate the sustainability forecast associated with the energy grid. In another example, processing the sustainability information comprises normalizing the sustainability information. In a further example, the generated sustainability forecast is provided in association with an expiration date for the generated sustainability forecast.

In a further aspect, the technology relates to a method for managing computing device behavior based on a sustainability forecast. The method comprises: obtaining the sustainability forecast that includes a set of estimated energy characteristics for an energy grid associated with the computing device; evaluating the sustainability forecast to determine a time to perform functionality of the computing device, wherein the determined time has an associated energy characteristic that indicates a lower estimated impact than an energy characteristic associated with another time; and scheduling the functionality to be performed at the determined time. In an example, the method further comprises performing intermediate functionality associated with the scheduled functionality prior to the determined time. In another example, the sustainability forecast is obtained from a sustainability platform based on a location associated with the computing device. In a further example, the sustainability forecast is for a predetermined time period; and the method further comprises: obtaining an updated sustainability forecast based on determining the predetermined time period has elapsed. In yet another example, the method further comprises: determining a location of the computing device has changed; and in response to determining the location has changed, obtaining an updated sustainability forecast. In a further still example, the method further comprises: presenting, to a user of the computing device, a notification that the functionality will be performed at the determined time; identifying user acceptance associated with the notification; and in response to the identified user acceptance, scheduling the functionality to be performed at the determined time. In another example, identifying the user acceptance includes one of: receiving user actuation of an accept button of the notification; or identifying a predetermined amount of time has elapsed during which user input associated with a reject button of the notification was not received. In a further example, the functionality of the computing device includes one or more of: indexing storage of the system; downloading a software update; installing the software update; performing a backup; or charging a battery of the system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system comprising:
    at least one processor; and
    memory storing instructions that, when executed by the at least one processor, causes the system to perform a set of operations, the set of operations comprising:
        obtaining, by the system, a sustainability forecast including a set of estimated energy characteristics for an energy grid providing energy to the system;
        determining a functionality to be performed by the system, wherein performing the functionality by the system is associated with an energy consumption having an impact on the energy grid;
        evaluating the sustainability forecast to determine a time to perform the functionality by the system, wherein the determined time has an associated energy characteristic that indicates a lower estimated impact than an energy characteristic associated with another time; and
        scheduling, by the system, the functionality to be performed at the determined time.

2. The system of claim 1, wherein the set of operations further comprises:
    performing intermediate functionality associated with the scheduled functionality prior to the determined time.

3. The system of claim 1, wherein the sustainability forecast is obtained from a sustainability platform based on a location associated with the system.

4. The system of claim 1, wherein:
    the sustainability forecast is for a predetermined time period; and
    the set of operations further comprises:
        obtaining an updated sustainability forecast based on determining the predetermined time period has elapsed.

5. The system of claim 1, wherein the set of operations further comprises:
    determining a location of the system has changed; and
    in response to determining the location has changed, obtaining an updated sustainability forecast.

6. The system of claim 1, wherein the set of operations further comprises:
    presenting, to a user of the system, a notification that the functionality will be performed at the determined time;

identifying user acceptance associated with the notification; and in response to the identified user acceptance, scheduling the functionality to be performed at the determined time.

7. The system of claim 6, wherein identifying the user acceptance includes one of:

receiving user actuation of an accept button of the notification; or identifying a predetermined amount of time has elapsed during which user input associated with a reject button of the notification was not received.

8. The system of claim 1, wherein the functionality of the system includes one or more of:

indexing storage of the system;
downloading a software update;
installing the software update;
performing a backup; or
charging a battery of the system.

9. A method for generating a sustainability forecast for an energy grid providing energy to a computing device, the method comprising:

receiving, from the computing device, a sustainability forecast request, wherein performing a functionality by the computing device is associated with an energy consumption having an impact on the energy grid;

determining a location associated with the computing device;

generating a sustainability forecast for the energy grid associated with the location, wherein the sustainability forecast comprises a set of entries and each entry indicates an estimated energy characteristic associated with the location for a period of time, and wherein the estimated energy characteristic indicates an estimated impact on the energy grid of performing the functionality by the computing device; and providing, in response to the received sustainability forecast request, the generated sustainability forecast, wherein the generated sustainability forecast is utilized by the computing device to manage performing the functionality at a time associated with a lower estimated impact on the energy grid.

10. The method of claim 9, further comprising:

obtaining sustainability information from a data provider; and processing the sustainability information to generate the sustainability forecast associated with the energy grid.

11. The method of claim 10, wherein processing the sustainability information comprises normalizing the sustainability information.

12. The method of claim 9, wherein the generated sustainability forecast is provided in association with an expiration date for the generated sustainability forecast.

13. A method for managing computing device behavior by a computing device based on a sustainability forecast, the method comprising:

obtaining, by the computing device, the sustainability forecast that includes a set of estimated energy characteristics for an energy grid providing energy to the computing device;

determining a functionality to be performed by the computing device, wherein performing the functionality by the computing device is associated with an energy consumption having an impact on the energy grid;

evaluating the sustainability forecast to determine a time to perform the functionality BY the computing device, wherein the determined time has an associated energy characteristic that indicates a lower estimated impact than an energy characteristic associated with another time; and scheduling, by the computing device, the functionality to be performed at the determined time.

14. The method of claim 13, further comprising:

performing intermediate functionality associated with the scheduled functionality prior to the determined time.

15. The method of claim 13, wherein the sustainability forecast is obtained from a sustainability platform based on a location associated with the computing device.

16. The method of claim 13, wherein the sustainability forecast is for a predetermined time period, the method further comprising:

obtaining an updated sustainability forecast based on determining the predetermined time period has elapsed.

17. The method of claim 13, further comprising:

determining a location of the computing device has changed; and in response to determining the location has changed, obtaining an updated sustainability forecast.

18. The method of claim 13, further comprising:

presenting, to a user of the computing device, a notification that the functionality will be performed at the determined time;

identifying user acceptance associated with the notification; and in response to the identified user acceptance, scheduling the functionality to be performed at the determined time.

19. The method of claim 18, wherein identifying the user acceptance includes one of:

receiving user actuation of an accept button of the notification; or identifying a predetermined amount of time has elapsed during which user input associated with a reject button of the notification was not received.

20. The method of claim 13, wherein the functionality of the computing device includes one or more of:

indexing storage of the system;
downloading a software update;
installing the software update;
performing a backup; or
charging a battery of the system.

* * * * *